(12) United States Patent
Tarozzi

(10) Patent No.: US 12,186,934 B2
(45) Date of Patent: Jan. 7, 2025

(54) PROCESS AND SYSTEM FOR THE PRODUCTION OF SLABS MADE OF MINERAL GRITS BOUND WITH RESINS

(71) Applicant: MEDICAL SOPARFI S.A, Luxembourg (LU)

(72) Inventor: Fabio Tarozzi, Luxembourg (LU)

(73) Assignee: MEDICAL SOPARFI S.A, Luxembourg (LU)

( * ) Notice: Subject to any disclaimer, the term of this patent is extended or adjusted under 35 U.S.C. 154(b) by 164 days.

(21) Appl. No.: 17/778,443

(22) PCT Filed: Nov. 19, 2020

(86) PCT No.: PCT/IB2020/060932
§ 371 (c)(1),
(2) Date: May 20, 2022

(87) PCT Pub. No.: WO2021/099994
PCT Pub. Date: May 27, 2021

(65) Prior Publication Data
US 2022/0410427 A1   Dec. 29, 2022

(30) Foreign Application Priority Data

Nov. 22, 2019  (IT) .................. 102019000021927

(51) Int. Cl.
*B28B 1/00*   (2006.01)
*B28B 11/00*  (2006.01)
*B28B 11/04*  (2006.01)

(52) U.S. Cl.
CPC ............ *B28B 1/005* (2013.01); *B28B 11/001* (2013.01); *B28B 11/048* (2013.01)

(58) Field of Classification Search
CPC ............................... B28B 1/005; B28B 3/123
See application file for complete search history.

(56) References Cited

U.S. PATENT DOCUMENTS 5,658,508 A  *  8/1997  Yukawa .................. B29C 39/16
                                                                 425/371
9,707,698 B1 *  7/2017  Xie ......................... B28B 1/005
(Continued)

FOREIGN PATENT DOCUMENTS

CN        108 545 999 A      9/2018
WO    WO 2004/039547 A1     5/2004
WO    WO 2009/102091 A1     8/2009

*Primary Examiner* — Nicholas R Krasnow
(74) *Attorney, Agent, or Firm* — ASLAN LAW, P.C.

(57) ABSTRACT

A process for the production of slabs made of mineral grits bound with resins comprises at least the phases of supplying one basic mixture including mineral grits and resins; dispensing the basic mixture over a molding support so as to obtain a slab to be compacted provided with an exposed surface facing upwards and a laying surface facing downwards; compacting the slab to be compacted to obtain a compacted slab; and hardening the compacted slab to obtain a slab made of mineral grits; at least one decoration with ink by digital printing of at least the basic mixture carried out prior to the compaction, wherein the decoration phase includes at least one phase of pre-decoration by digital printing which is carried out prior to the dispensing and at least one phase of post-decoration by digital printing which is carried out after the dispensing.

12 Claims, 6 Drawing Sheets

(56) References Cited

U.S. PATENT DOCUMENTS

| | | | |
|---|---|---|---|
| 11,325,285 B2* | 5/2022 | Toncelli | B29C 67/244 |
| 11,872,730 B1* | 1/2024 | Xie | B28B 1/005 |
| 2015/0042006 A1* | 2/2015 | Kager | C04B 40/0071 |
| | | | 425/371 |
| 2018/0126673 A1* | 5/2018 | Sanchis Brines | B29C 67/244 |
| 2019/0099915 A1 | 4/2019 | Terry et al. | |
| 2019/0105800 A1* | 4/2019 | Xie | B28D 1/24 |
| 2019/0201928 A1* | 7/2019 | Xie | B05C 9/10 |
| 2019/0358851 A1* | 11/2019 | Babini | B30B 5/06 |
| 2024/0033969 A1* | 2/2024 | Adams | C04B 20/0076 |
| 2024/0122574 A1* | 4/2024 | Cao | A61B 8/085 |

\* cited by examiner

PROCESS AND SYSTEM FOR THE PRODUCTION OF SLABS MADE OF MINERAL GRITS BOUND WITH RESINS

CROSS-REFERENCE TO RELATED APPLICATIONS

This application claims priority to IT patent application No. 102019000021927 filed on Nov. 22, 2019, and this application claims priority to and is a 371 of international PCT Application No. PCT/IB2020/060932 filed on Nov. 19, 2020, the entire contents of which are hereby incorporated by reference.

TECHNICAL FIELD

The present invention relates to a procedure and a system for the production of slabs made of mineral grits bound with resins.

BACKGROUND ART

In some production sectors, such as e.g. construction and furnishing, but not only, slabs made of mineral grits bound with resins are now widely used.

As far as aesthetic and functional characteristics are concerned, these slabs are completely comparable to the slabs directly obtained from natural materials such as marble, granite, or the like.

Compared to the latter, however, the slabs made of mineral grits bound with resins also have further important advantages.

First of all, these can be made in numerous variants distinguished by colors and/or designs and/or aesthetic effects that cannot be obtained using the natural materials mentioned above: in other words, therefore, their production is more versatile and customizable to meet customer requirements.

Another advantage is that, since the material obtained is less porous, for example, than marble, it is substantially unassailable by the most commonly used liquids; moreover, it is more resistant to stains.

For these reasons, these slabs are widely used, for example, in the construction of worktops for kitchens, bathrooms and other similar applications.

The above mentioned slabs are produced from a mixture typically comprising minerals in granular form (e.g. marble, granite, glass, mirror fragments, and/or others) as well as quartz powder and resins that act as binders.

After having been prepared, this mixture is deposited inside a die, in which the molding cavity has the dimensions of the object to be obtained (unless any shrinkage that may occur in the subsequent production phases).

The mixture is then decorated in order to reproduce particular aesthetic effects present in natural rocks.

For example, decorations of the through type are made to obtain the so-called "veins", that is streaks of different color compared to the basic material, having an irregular pattern and crossing the entire thickness thereof.

The die is then introduced inside a compacting appliance in which the mixture is pressed inside the cavity, and simultaneously subjected to a vibrating action, so as to obtain a compacted slab.

In addition to this, it is expected that the compaction of the slabs will take place in a depressurized environment, i.e. at lower pressure than atmospheric pressure: in fact, the elimination of air from the molding area further facilitates the compaction of the materials of the mixture.

Afterwards, the compacted slab undergoes a final hardening phase in order to give it the desired mechanical strength.

The procedures and systems of known type do however have some drawbacks mainly related to the difficulty of obtaining slabs made of mineral grits provided with valuable decorative effects that remain unchanged for the entire machining cycle.

In fact, after pressing, the slabs have an irregular surface and need to be smoothed.

This operation involves the removal of material which, although partial, can lead to the alteration of the surface decorations applied to the slab in the previous phases, thus affecting the entire machining.

In the procedures of known type it is also ascertained the difficulty to faithfully reproduce the surface appearance of natural rocks or to vary the surface finish of the slabs to obtain the desired aesthetic effect.

DESCRIPTION OF THE INVENTION

The main aim of the present invention is to devise a procedure and a system for the production of slabs made of mineral grits bound with resins that allow making in a simple and reliable manner slabs made of mineral grits with decorative effects that remain unchanged as a result of the finishing operations. A further object of the present invention is to devise a procedure and a system for the production of slabs made of mineral grits bound with resins that allow obtaining a wide variety of aesthetic effects in a simple and reliable manner.

Another object of the present invention is to devise a procedure and a system for the production of slabs made of mineral grits bound with resins that allow overcoming the above mentioned drawbacks of the prior art in a simple, rational, easy, effective and affordable solution.

The above mentioned objects are achieved by the present procedure for the production of slabs made of mineral grits bound with resins having the characteristics of claim 1.

The above mentioned objects are achieved by the present system for the production of slabs made of mineral grits bound with resins having the characteristics of the claimed invention.

BRIEF DESCRIPTION OF THE DRAWINGS

Other characteristics and advantages of the present invention will be more evident from the description of a preferred, but not exclusive, embodiment of a procedure and a system for the production of slabs made of mineral grits bound with resins, illustrated by way of an indicative, yet non-limiting example, in the attached tables of drawings in which.

EMBODIMENTS OF THE INVENTION

Figure 1:
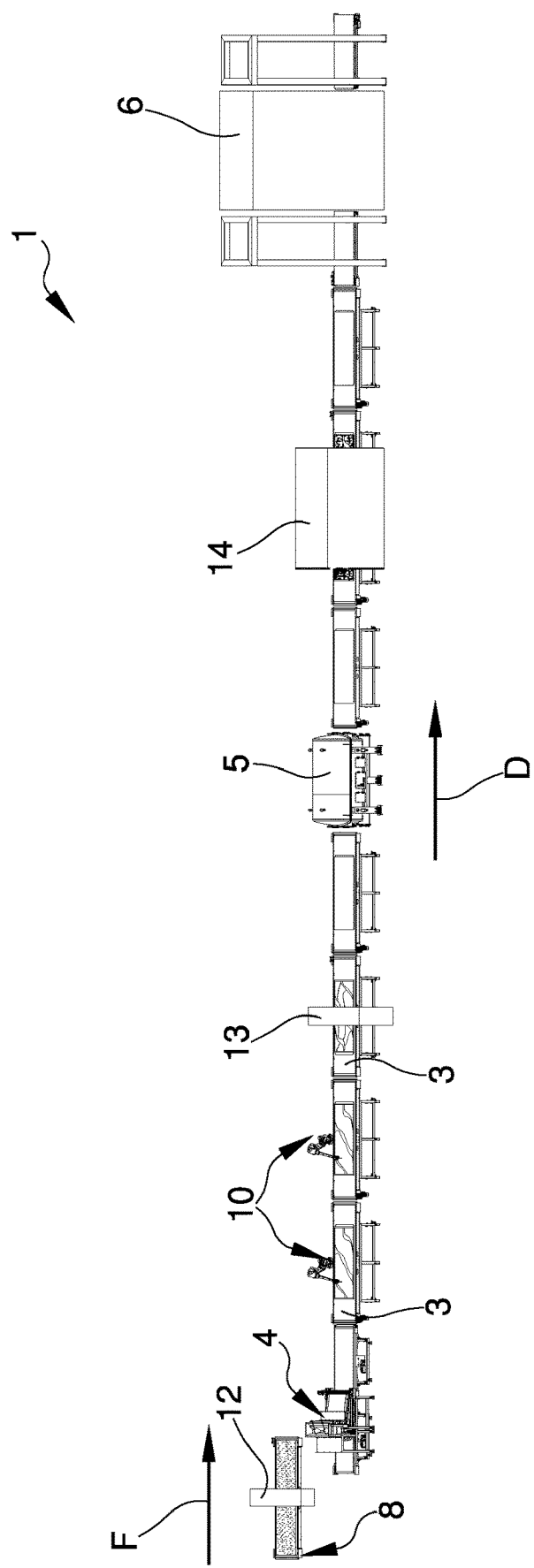
FIG. 1 is a top view of a system for the production of slabs made of mineral grits bound with resins according to the invention.
Figure 2:
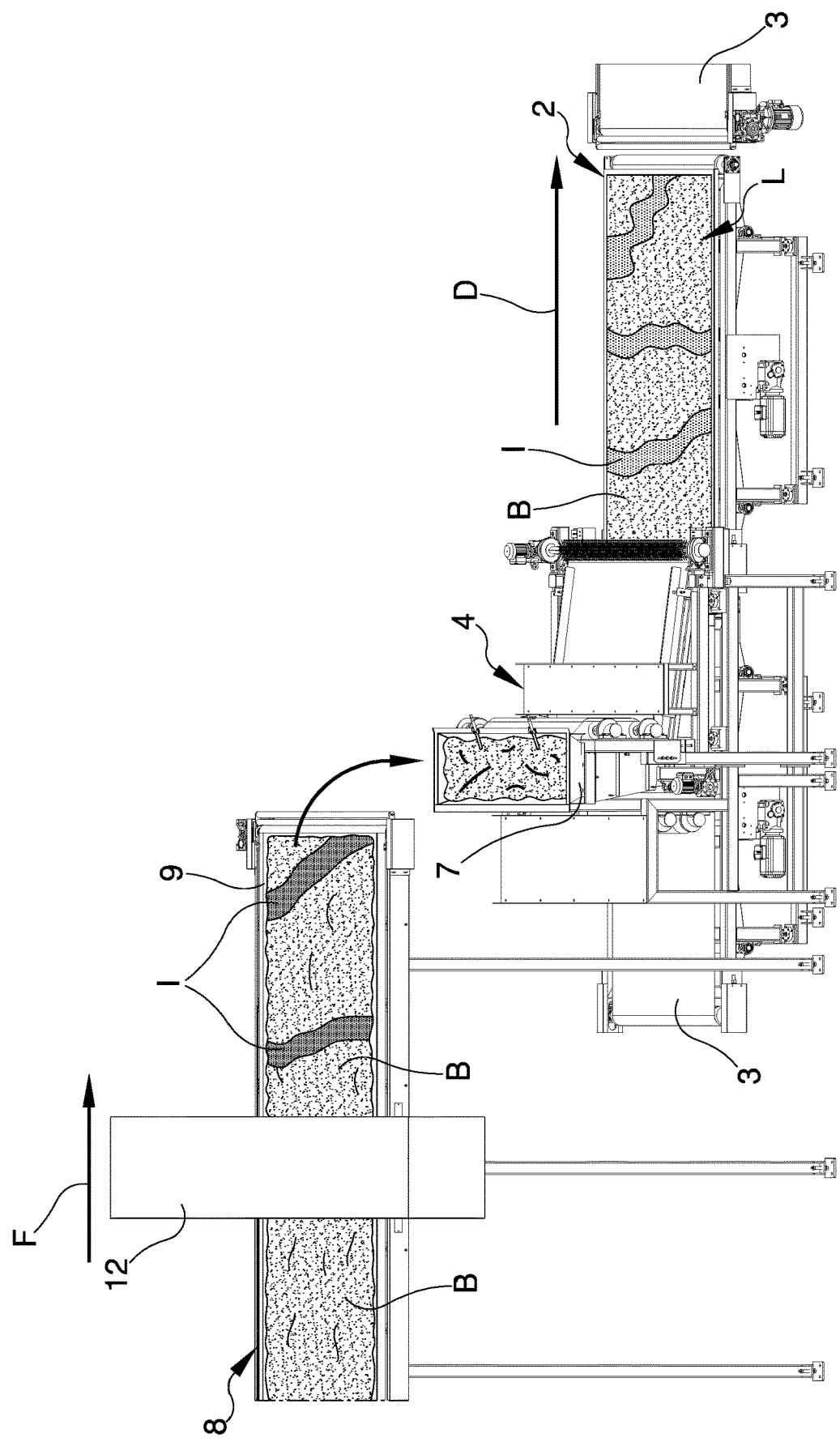
FIGS. 2-6 are perspective views of the system for the production of slabs made of mineral grits bound with resins in the execution of the procedure according to the invention.
Figure 3:
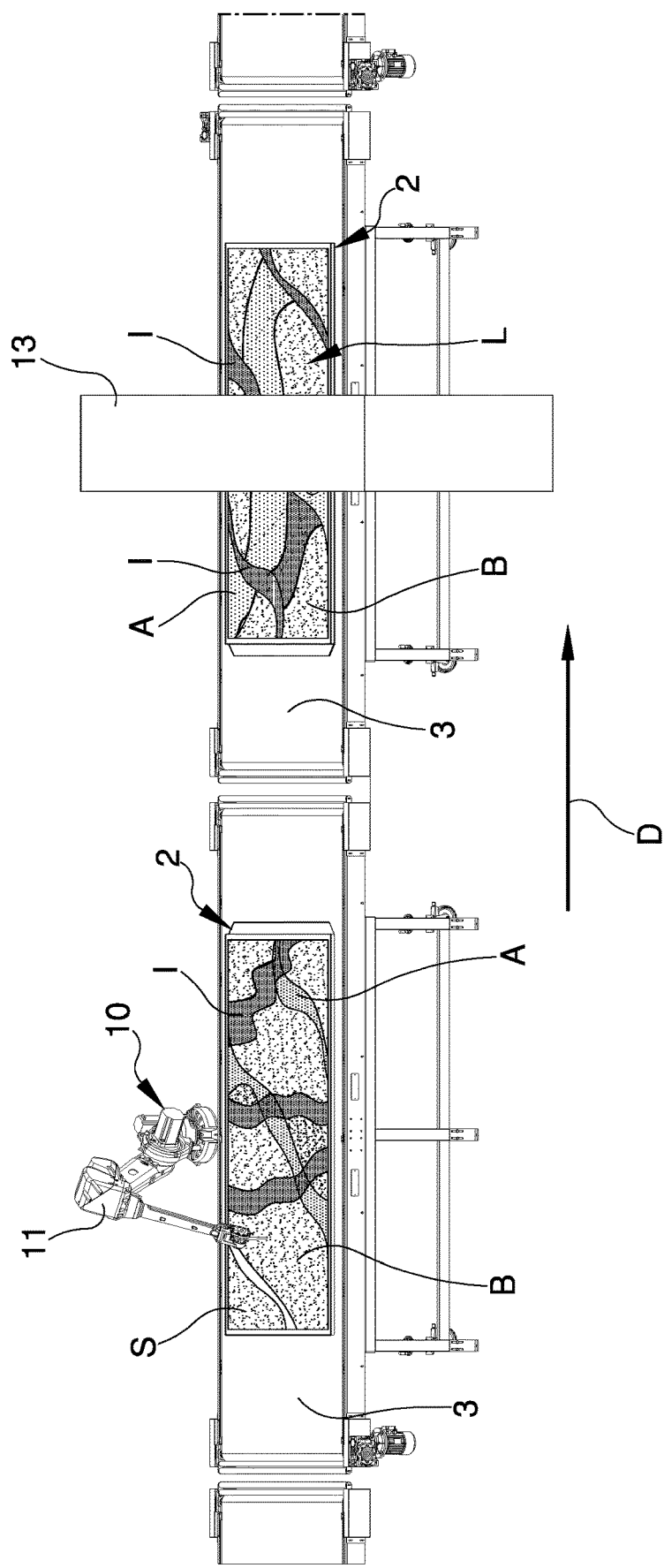

With particular reference to these figures, reference numeral 1 globally indicates a system for the production of slabs made of mineral grits bound with resins.

The system 1 comprises:
- at least one molding support 2 positioned resting on a support surface 3 movable along a direction of forward movement D;
- dispensing means 4 of at least one basic mixture B comprising mineral grits and resins on the molding support 2 so as to obtain a slab to be compacted L;
- compacting means 5 of the slab to be compacted L to obtain a compacted slab C;
- hardening means 6 of the compacted slab C to obtain a slab made of mineral grits.

Within the scope of the present discussion, mineral grits and resins are meant to be minerals in granular form, e.g. marble, granite, glass, mirror fragments, and/or others, as well as quartz powder, while resins may be, e.g., of the thermosetting type, especially for construction and furnishing applications.

In the embodiment shown in the figures, the molding support 2 is of the type of a molding die open at the top and defining a cavity adapted to contain the basic mixture B.

In particular, the cavity has substantially the size of the slab to be obtained, unless any shrinkage that may occur in subsequent production phases.

The molding die can be made of a rigid or flexible material, e.g. made of polymeric and/or elastomeric material.

In a further embodiment, which is not shown in detail in the figures, the molding support 2 is of the type of a sheet, made e.g. of a paper material.

The molding support 2 is positioned resting on the support surface 3.

The support surface 3 is of the type of a conveyor belt, a roller conveyor, or the like.

Further embodiment solutions cannot however be ruled out wherein the support surface 3 is of the fixed type and the dispensing means 4 are movable with respect thereto along the direction of forward movement D.

The dispensing means 4 comprise at least one hopper 7 adapted to release the basic mixture B on the molding support 2.

In particular, the hopper 7, as a result of the movement of the support surface 3 along the direction of forward movement D, deposits the basic mixture B on the molding support 2 so as to obtain the slab to be compacted L.

The slab to be compacted L has a laying surface facing downwards and an exposed surface S facing upwards.

The laying surface is intended, in use, to be applied on the surface to be covered, while the exposed surface S is intended, in use, to be visible.

Conveniently, the system 1 also comprises loading means 8 arranged at the point where the dispensing means 4 are located and adapted to load the basic mixture B inside the hopper 7.

In more detail, the loading means 8 comprise a feeding surface 9, on which the basic mixture B is deposited, moving along a direction of loading F substantially parallel to the direction of forward movement D.

The feeding surface 9 is of the type of a conveyor belt or the like and is adapted to transport the basic mixture B to the dispensing means 4.

In the embodiment shown in the figures, the system 1 also comprises application means 10 adapted to apply at least one additional mixture A to the basic mixture B. The application means 10 are arranged downstream of the dispensing means 4 with respect to the direction of forward movement D.

More specifically, the additional mixture A comprises one or more pigments, natural or synthetic, in solid or liquid form. The additional mixture A can also be made of mineral grits bound with resins and, in this case, differs from the basic mixture B by at least one of grain size, color or composition of the mineral grits.

The application of the additional mixture A is intended to create veins in the basic mixture B, i.e. streaks of a different color than the basic mixture B. The application can be carried out according to various intensities in order to create more or less fine veins.

In particular, the application is carried out at least on the exposed surface S of the slab to be compacted L.

Alternatively or in combination, the application can also be carried out full-bodied, in order to create "through" type veins, i.e. that extend for the entire thickness of the slab to be compacted L.

Preferably, the application means 10 comprise at least one dispensing device 11, of the type of an anthropomorphic mechanical arm, adapted to dispense the additional mixture A according to a predetermined trajectory.

The application means 10 can also comprise one of either a suction device and a displacement device of the basic mixture B positioned upstream of the dispensing device 11 and also movable along the same predetermined trajectory in order to define a groove inside which the additional mixture A is then dispensed.

In the embodiment shown in the illustrations, the application means 10 comprise a plurality of dispensing devices 11 arranged in succession along the direction of forward movement D and each adapted to dispense a respective additional mixture A to the basic mixture B.

The presence of a plurality of dispensing devices 11 allows obtaining a plurality of different decorative effects on the same slab.

As shown in the figures, the application means 10 are arranged upstream of the compacting means 5.

The compacting means 5 are of known type and, in particular, they allow carrying out compaction by means of vibrating-pressure under vacuum.

Through this operation, the mixtures B and A are pressed and simultaneously subjected to a vibrating action, which facilitates the adhesion of the grits that make up the slab to be compacted L.

At the same time, a suction operation is carried out to create a depressurized environment in order to eliminate the air present in the gaps between the mineral grits and further optimize the compaction of the slab to be compacted L.

In order to avoid direct contact of the mixtures B and A with the compacting means 5, the molding support 2 comprises a covering element 2a adapted to cover the exposed surface S of the slab to be compacted L prior to compaction.

With reference to the embodiment shown in the figures, the covering element 2a is of the type of a cover that closes the aforementioned cavity and that is placed on the exposed surface S.

Alternatively, in the embodiment in which the molding support 2 is of the type of a sheet of paper material, the covering element 2a is also represented by a covering sheet, made of paper material, which can be positioned on the exposed surface S of the slab to be compacted L.

Afterwards, the compacted slab C is transferred to the above mentioned hardening means 6.

More specifically, the hardening means 6 comprise a heated chamber in which the catalysis of the resins present in mixtures B and A takes place in order to obtain the slab provided with the desired mechanical and physical properties.

The system 1 may also comprise finishing means, not shown in the figures, adapted to finish the slab superficially and arranged downstream of the hardening means 6.

Specifically, the finishing means are adapted to make at least one sanding of the exposed surface S of the slab.

The system 1 comprises decoration means 12,13 by digital printing, arranged upstream of the compacting means 5 with respect to the direction of forward movement D, adapted to deliver at least one ink I onto at least the basic mixture B.

The decoration means 12,13 are of the type of a digital ink printer, which comprises a plurality of movable heads, adapted to deliver ink I according to a predefined design.

In particular, the ink I is of the penetrating type and can penetrate into the exposed surface S of the slab to be compacted L up to a depth comprised between a range of few millimeters and the entire thickness of the slab.

According to the invention, the decoration means 12,13 comprise pre-decoration means 12 by digital printing arranged upstream of the dispensing means 4.

In particular, the pre-decoration means 12 are arranged at the point where the loading means 8 are located.

The pre-decoration means 12 have the function of applying ink I onto the basic mixture B prior to its loading inside the hopper 7.

More specifically, the pre-decoration means 12 have the function of giving the basic mixture B special color effects, which cannot be achieved by mixing the generally used mineral grits.

The ink I applied on the basic mixture B, after the latter has been loaded inside the hopper 7 and then dispensed onto the molding support 2, results in color spots scattered on the slab to be compacted L.

Still according to the invention, the decoration means 12,13 also comprise post-decoration means 13 by digital printing arranged downstream of the dispensing means 4.

In particular, the post-decoration means 13 are arranged between the application means 10 and the compacting means 5.

The post-decoration means 13 have the function of finishing the decorations made by means of the application means 10, following the same predetermined trajectory traced by the dispensing devices 11 and/or of adding new decorations according to different predefined designs, before subjecting the slab to be compacted L to the compaction phase.

Figure 6:
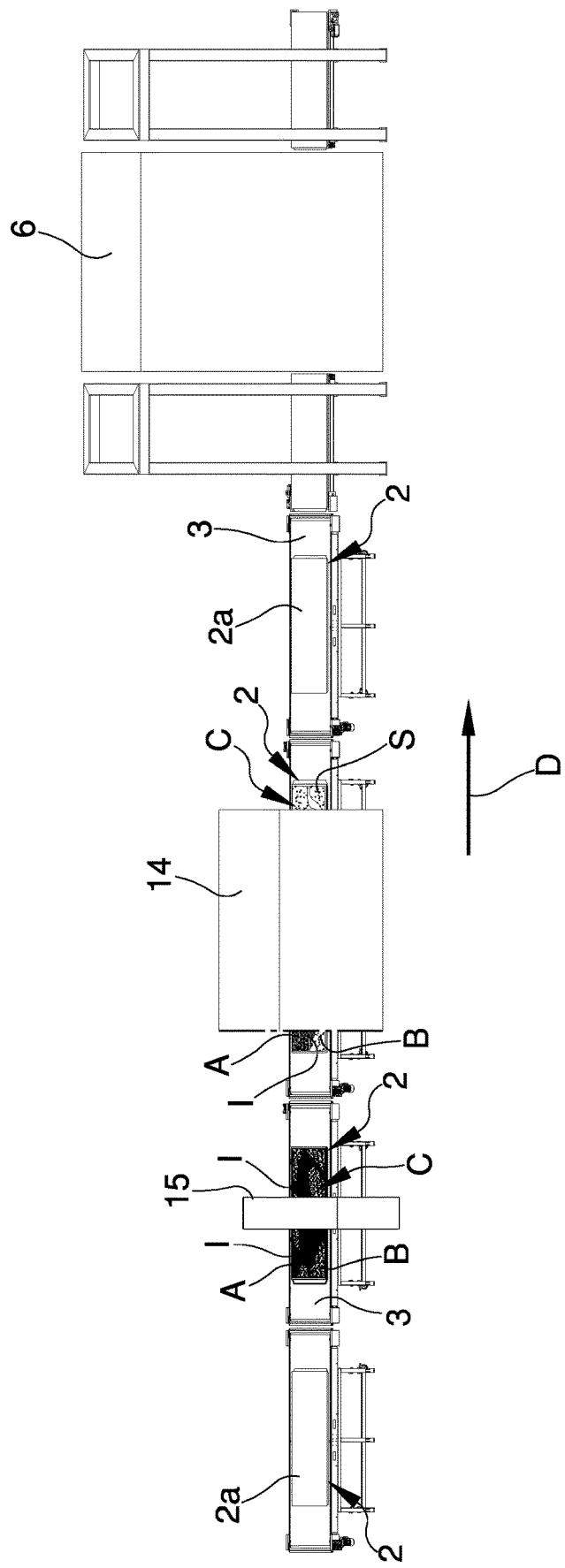

Alternatively or in combination, the system 1 comprises additional decoration means 15, shown in FIG. 6, arranged downstream of the compacting means 5 and adapted to dispense at least one ink I on the basic mixture B and/or on the additional mixture A.

In particular, the additional decoration means 15 are positioned between the compacting means 5 and the hardening means 6.

Similarly to the above, also the additional decoration means 15 are of the type of an ink digital printer comprising a plurality of movable heads, adapted to dispense ink I on the exposed surface S of the compacted slab C.

The additional decoration means 15 have the function of finishing, after compaction, the decorations present on the exposed surface S following the predetermined trajectory traced by the dispensing devices 11 and/or of adding new decorations according to further predefined designs, before subjecting the compacted slab C to the hardening phase.

The additional decoration means 15 can, therefore, dispense ink I in order to resume the decoration carried out by the decoration means 12,13 and/or to carry out different types of decorations.

Conveniently, the system 1 comprises preheating means 14 adapted to preheat the compacted slab C, arranged between the compacting means 5 and the hardening means 6.

If additional decoration means 15 are provided, the preheating means 14 are positioned between the latter and the hardening means 6.

The preheating means 14 have the function of promoting the penetration of ink I inside the compacted slab C to reach the desired depth, so that the aesthetic effect thus obtained is visible even after the exposed surface S has been sanded.

The operation of the system 1 in the execution of the procedure according to the invention is as follows.

The procedure to which the present invention relates involves first of all the supply of the basic mixture B.

Afterwards, the basic mixture B is loaded inside the hopper 7.

In particular, the basic mixture B is deposited on top of the feeding surface 9 and transported along the direction of loading F towards the dispensing means 4.

The basic mixture B is then dispensed onto the molding support 2 in order to obtain a downward-facing laying surface and an upward-facing exposed surface S.

In particular, in the embodiment shown in the figures, the dispensing is carried out by means of the dispensing means 4 that release the basic mixture B onto the molding support 2, positioned resting on the support surface 3.

Advantageously, after the basic mixture B has been loaded onto the molding support 2, a phase of application of at least one additional mixture A of mineral grits and resins is carried out to the basic mixture B.

In the embodiment of the system 1 described above, the molding support 2, and therefore the basic mixture B, is moved along the direction of forward movement D by means of the support surface 3 until it reaches the application means 10 of the additional mixture A to the basic mixture B.

The application of the additional mixture A to the basic mixture B is carried out according to at least one predetermined trajectory.

Then, the compaction of the slab to be compacted L is carried out, to obtain a compacted slab C, and the hardening of the compacted slab C to obtain the slab made of mineral grits.

Prior to compaction, the procedure comprises at least one phase of decorating with ink I by digital printing at least the basic mixture B.

According to the invention, the decoration comprises a pre-decoration phase by digital printing carried out prior to the dispensing of the basic mixture B.

The phase of pre-decoration is carried out using the pre-decoration means 12. Specifically, the pre-decoration is carried out on the basic mixture B deposited on the feeding surface 9, before its loading inside the hopper 7.

Still according to the invention, the decoration comprises one phase of post-decoration by digital printing which is carried out after the dispensing of the basic mixture B.

The phase of post-decoration is carried out by means of the post-decoration means 13.

Post-decoration is conveniently carried out after the application of the additional mixture A.

Post-decoration, in fact, can be performed following the predetermined trajectory to dispense the ink I at the point where the additional mixture A is located, or according to a different predefined design.

The slab to be compacted L is then transferred by means of the support surface 3 to the compacting means 5 where the basic mixture B and the at least one additional mixture A deposited on the molding support 2 are compacted.

Before compaction, the procedure conveniently comprised covering the exposed surface S of the slab to be compacted L by means of the covering element 2a.

Figure 4:
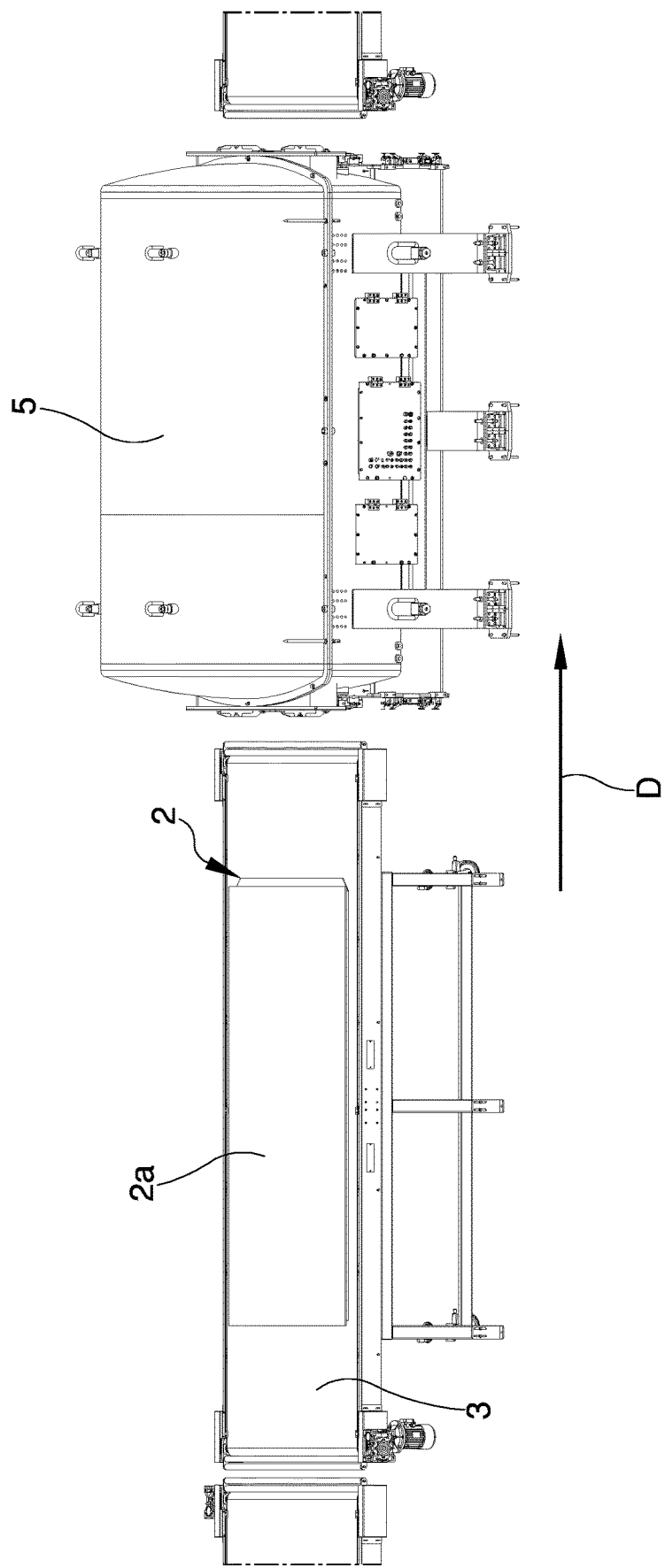

In particular, as shown in FIG. 4, the procedure comprises a first closure of the molding die by means of the cover.

In a further embodiment, shown in FIG. 6, after compaction, the procedure comprises at least one phase of additional decoration with ink I by digital printing of the compacted slab, which is carried out by means of the additional decoration means 15.

Conveniently, after compaction, the exposed surface S of the compacted slab C is freed to allow for the phase of additional decoration.

Specifically, the molding die is opened by removing the cover.

Similarly to the phase of post-decoration, the additional decoration can be carried out following the predetermined trajectory in order to dispense ink I at the point where the additional mixture A is located.

Alternatively, the additional decoration can be carried out by dispensing ink I according to a predefined design which is different from the predetermined trajectory defined by the application means 10.

The decoration of the compacted slab C is then carried out on the basic mixture B and possibly also on the additional mixture A, still "wet", i.e. before being subjected to the hardening phase.

Before the hardening phase, a phase of at least partial infiltration of ink I into the compacted slab C is carried out to allow ink I to penetrate inside its thickness.

The infiltration is conveniently carried out by preheating the compacted slab C by means of the preheating means 14.

If the additional decoration is carried out, the infiltration phase is carried out after the additional decoration itself.

This preheating is preferably carried out at a temperature comprised between 30° C. and 60° C.

Preheating is preferably carried out with the exposed surface S of the compacted slab C free at the top.

In particular, with reference to the embodiment shown in the figures, preheating is carried out with the molding die open at the top.

This promotes the heating of the exposed surface S and the infiltration of ink I into the compacted slab C.

Figure 5:
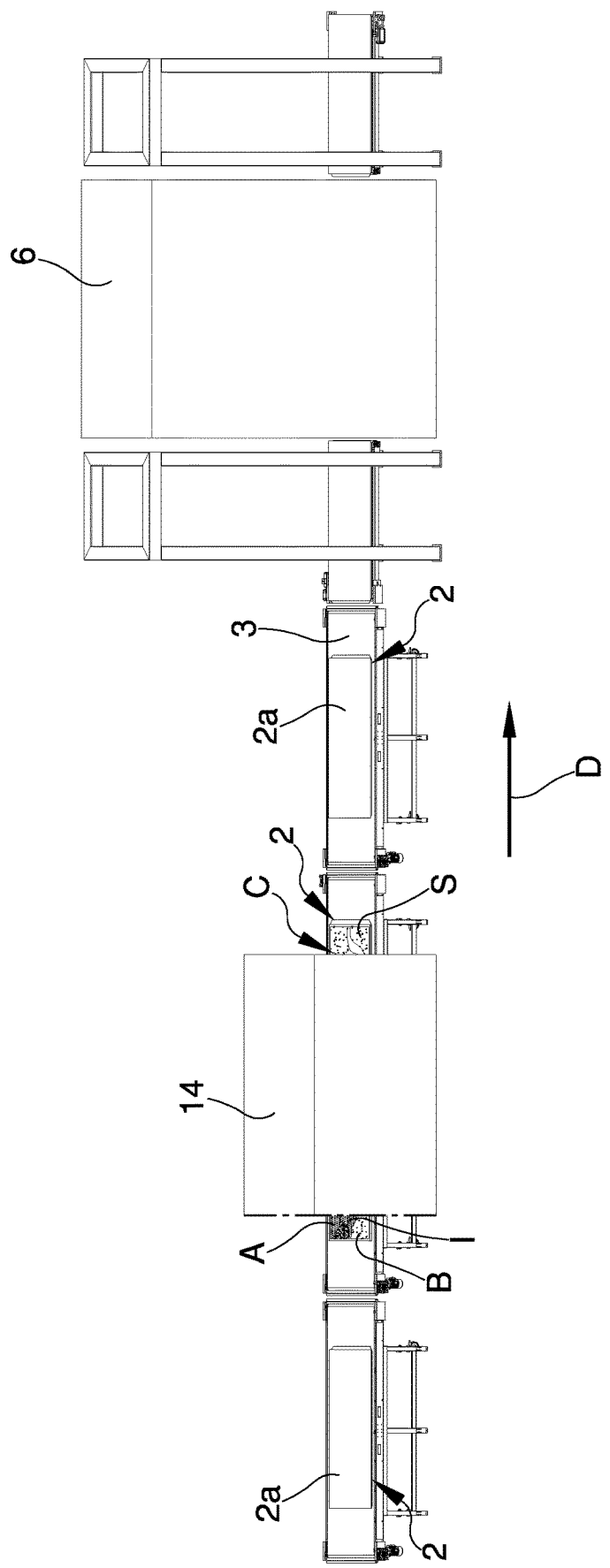

Finally, the compacted slab C is transferred to the hardening means 6. (FIG. 5)

The hardening phase is carried out by heating the compacted slab C, at a temperature between 100° C. and 150° C.

Conveniently, between the preheating phase and the hardening phase, the procedure comprises again covering the exposed surface S of the slab to be compacted L by means of the covering element 2a.

Preferably, after the hardening phase, the slab is removed from the molding support 2 and the slab itself is sanded.

The sanding is carried out by partial removal of material from the slab and allows obtaining a smoother and more regular exposed surface S.

The particular solution of providing a post-decoration phase and an additional decoration carried out with penetrating ink I ensures that the sanding, as a result of the removal of material, does not alter the decorative effects given to the slab during the previous machining phases.

It has in practice been ascertained that the described invention achieves the intended objects and in particular the fact is underlined that the procedure and the system according to the invention allow obtaining slabs made of mineral grits with a wide variety of different aesthetic effects.

This is possible thanks to the decoration by digital printing of the slab prior to and, if necessary, after its compaction. The use of digital printing also allows the exact reproduction of the design created by means of the application of the additional mixture, if any.

The procedure and the system according to the invention allow making in a simple and reliable manner slabs made of mineral grits with decorative effects that remain unchanged during the whole machining and after the finishing operations.

The invention claimed is:

1. A process for the production of slabs made of mineral grits bound with resins comprising at least the phases of:
   supplying at least one basic mixture including mineral grits and resins;
   dispensing said basic mixture over a molding support so as to obtain a slab to be compacted provided with an exposed surface facing upwards and a laying surface facing downwards;
   compacting said slab to be compacted to obtain a compacted slab; and
   hardening said compacted slab to obtain a slab made of said mineral grits;
   at least one decoration with ink by digital printing of at least said basic mixture carried out prior to said compaction, wherein
   said decoration includes at least one phase of pre-decoration by digital printing which is carried out prior to said dispensing, and
   said decoration includes at least one phase of post-decoration by digital printing which is carried out after said dispensing.

2. The process according to claim 1, wherein said dispensing is carried out by means of at least one hopper adapted to release said basic mixture on said molding support, wherein said process further comprises a phase of loading said basic mixture being carried out by depositing said basic mixture on a movable feeding surface along a loading direction towards said hopper and introducing said basic mixture inside the hopper itself and wherein said pre-decoration is carried out on said basic mixture deposited on said feeding surface, prior to its loading inside said hopper.

3. The process according to claim 1, further comprising: after said dispensing, a phase of application of at least one additional mixture includes said mineral grits and resins to said basic mixture.

4. The process according to claim 1, wherein said application is carried out at least on said exposed surface of the slab to be compacted.

5. The process according to claim 1, wherein said application is carried out according to at least one predetermined trajectory.

6. The process according to claim 1, wherein said post-decoration is carried out after said application.

7. The process according to claim 1, wherein said post-decoration is carried out following said predetermined trajectory to dispense said ink at the point where said additional mixture is located.

8. The process according to claim 1, further comprising: after said compacting, at least one additional phase of decoration with ink by digital printing of said compacted slab.

9. The process according to claim 8, wherein said additional decoration is carried out following said predetermined trajectory to dispense said ink at the point where said additional mixture is located.

10. The process according to claim 1, further comprising: prior to said hardening, a phase of at least partial infiltration of said ink into said compacted slab.

11. The process according to claim 10, wherein said infiltration is carried out by pre-heating said compacted sheet.

12. The process according to claim 1, wherein said molding support includes at least one molding die open at the top and adapted to contain at least said basic mixture, said pre-heating being carried out with said molding die open at the top.

\* \* \* \* \*